United States Patent
Lin et al.

(10) Patent No.: US 8,355,267 B2
(45) Date of Patent: Jan. 15, 2013

(54) METHOD OF DETECTION FOR OUTPUT SHORT CIRCUIT OF A FLYBACK POWER SUPPLY

(75) Inventors: Kun-Yu Lin, Pingtung (TW); Yu-Ming Chen, Hsinchu (TW); Pei-Lun Huang, Zhubei (TW)

(73) Assignee: Richpower Microelectronics Corporation, British West Indies (KY)

( * ) Notice: Subject to any disclaimer, the term of this patent is extended or adjusted under 35 U.S.C. 154(b) by 347 days.

(21) Appl. No.: 12/813,713

(22) Filed: Jun. 11, 2010

(65) Prior Publication Data
US 2010/0315843 A1    Dec. 16, 2010

(30) Foreign Application Priority Data
Jun. 16, 2009 (TW) ................................ 98120131 A (51) Int. Cl.
*H02H 7/122* (2006.01)

(52) U.S. Cl. ...................................... 363/56.1; 361/93.3
(58) Field of Classification Search ................. 363/56.1, 363/21.13; 361/93.3
See application file for complete search history.

(56) References Cited

U.S. PATENT DOCUMENTS

| 4,058,758 A * | 11/1977 | Peterson | ................ 363/80 |
| 7,388,360 B2 * | 6/2008 | Baurle et al. | ................ 323/284 |

* cited by examiner

*Primary Examiner* — Shawn Riley
(74) *Attorney, Agent, or Firm* — Muncy, Geissler, Olds & Lowe, PLLC (57) ABSTRACT

Disclosed are methods of detection for output short circuit of a flyback power supply, which detect the current sense signal provided by a current sense resistor serially connected to a power switch of the flyback power supply, and thus quickly identify whether or not the flyback power supply suffers output short circuit.

12 Claims, 9 Drawing Sheets

METHOD OF DETECTION FOR OUTPUT SHORT CIRCUIT OF A FLYBACK POWER SUPPLY

FIELD OF THE INVENTION

The present invention is related generally to flyback power supplies and, more particularly, to detection for output short circuit of a flyback power supply.

BACKGROUND OF THE INVENTION

Figure 1:
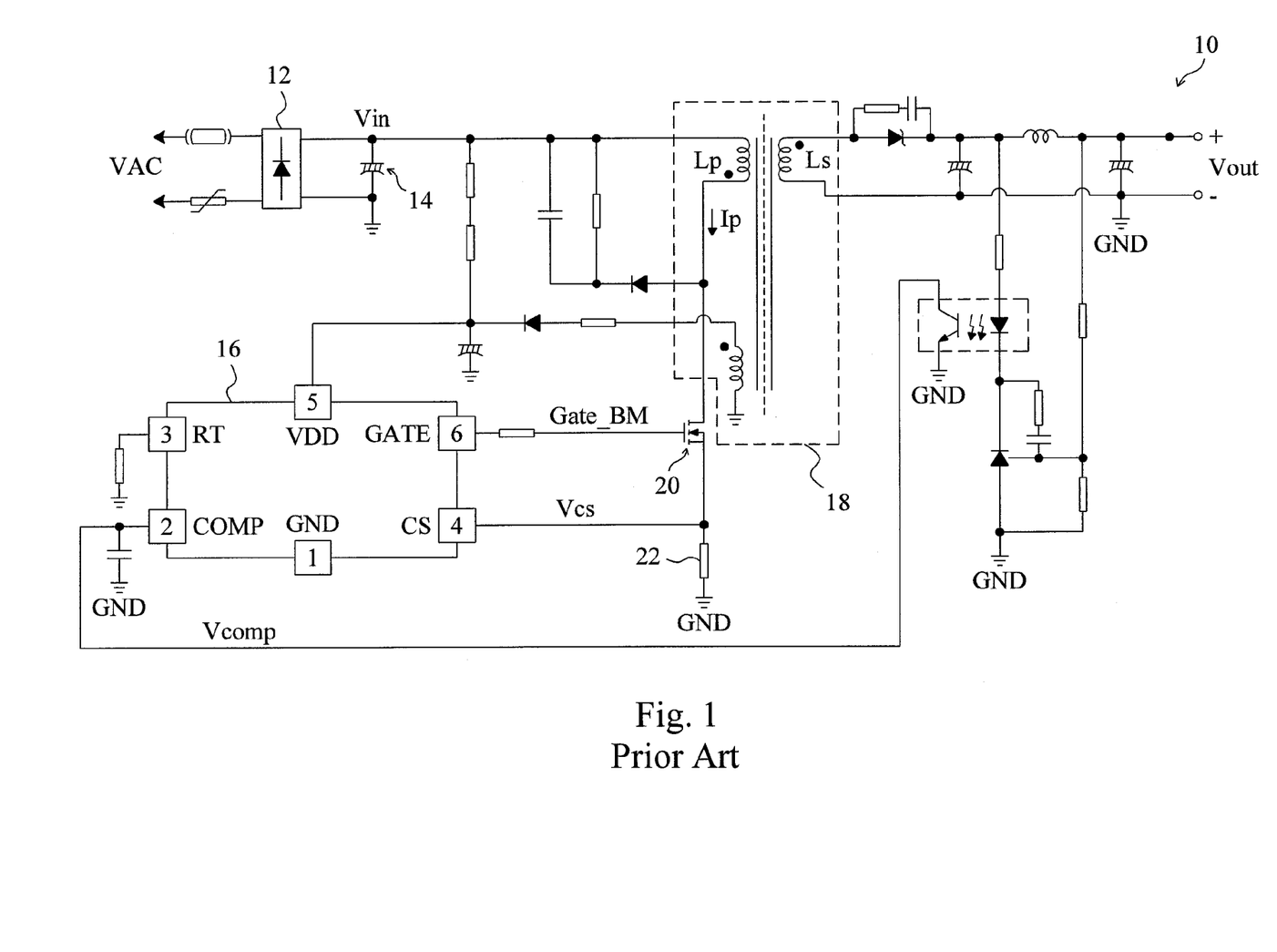
FIG. 1 is a circuit diagram of a typical flyback power supply.

Output short circuit has become an important item in the safety test of power supplies. Commercial power management integrated circuits (ICs) are all provided with built-in protection mechanism against output short circuit of power supplies. For example, as shown in FIG. 1, in a typical flyback power supply 10, the input alternating-current (AC) voltage Vac is first rectified and filtered by a diode bridge 12 and a capacitor 14 to a direct-current (DC) input voltage Vin to apply to a primary coil Lp of a transformer 18, and a power switch 20 is serially connected to the primary coil Lp and switched by a control signal Gate_BM provided by a power management IC 16 for the transformer 18 to deliver power from the primary coil Lp to a secondary coil Ls to thereby generate an output voltage Vout at a power output. A current sense resistor 22 is connected in series to the power switch 20 to sense the current Ip of the primary coil Lp, and the power management IC 16 determines the duty of the power switch 20 according to the current sense signal Vcs from the current sense resistor 22 and a feedback signal Vcomp derived from the power output Vout. Without any additional pins, the power management IC 16 usually carries out the detection for output short circuit of the flyback power supply 10 by using the feedback pin COMP or the power pin VDD, for triggering the built-in protection mechanism thereof. However, the information provided by the feedback pin COMP contains the message of the feedback open circuit, and the power pin VDD is connected to a capacitor, so that the output information cannot be immediately reflected. Conventionally, regardless of using the feedback pin COMP or the power pin VDD in the detection for output short circuit, it always takes tens to hundreds of milliseconds to determine if an output short circuit occurs. When the flyback power supply 10 suffers output short circuit, it will blowout a large current, which will induce considerable power consumption if the detection for output short circuit needs a long time, and thereby cause the flyback power supply 10 overheated.

Therefore, it is desired a method of quick and immediate detection for output short circuit of a flyback power supply.

BRIEF SUMMARY OF THE INVENTION

An object of the present invention is to provide a method of quick and immediate detection for output short circuit of a flyback power supply.

According to the present invention, a method of detection for output short circuit of a flyback power supply includes detecting the peak value and the initial value of the current in a power switch of the flyback power supply during a present cycle and the next cycle, and then identifying output short circuit by monitor the difference between the peak value and the initial value.

According to the present invention, a method of detection for output short circuit of a flyback power supply includes detecting the initial value and the peak value of the current in a power switch of the flyback power supply during a cycle, and then identifying output short circuit by monitor the difference between the peak value and the initial value.

According to the present invention, a method of detection for output short circuit of a flyback power supply includes detecting the initial value of the current in a power switch of the flyback power supply during a cycle, and if the initial value is greater than a threshold, concluding that the flyback power supply suffers output short circuit.

BRIEF DESCRIPTION OF THE DRAWINGS

These and other objects, features and advantages of the present invention will become apparent to those skilled in the art upon consideration of the following description of the preferred embodiments of the present invention taken in conjunction with the accompanying drawings, in which.

DETAIL DESCRIPTION OF THE INVENTION

From the circuit diagram shown in FIG. 1, it may derive the relationship $$n \times Vout = L \times \Delta Vcs/(Toff \times Rcs), \qquad [Eq-1]$$

where n is the turn ratio of the transformer 18, L is magnetizing inductance of the transformer 18, $\Delta Vcs$ is the variation of the current sense signal Vcs, Toff is the OFF time of the power switch 20, and Rcs is the resistance of the current sense resistor 22. The equation Eq-1 shows that the output information can be obtained by detecting the current sense signal Vcs via the current sense pin CS of the power management IC 16. Therefore, several methods of detection for output short circuit of a flyback power supply by using the current sense pin CS are proposed as illustrated in the following.

Figure 2:
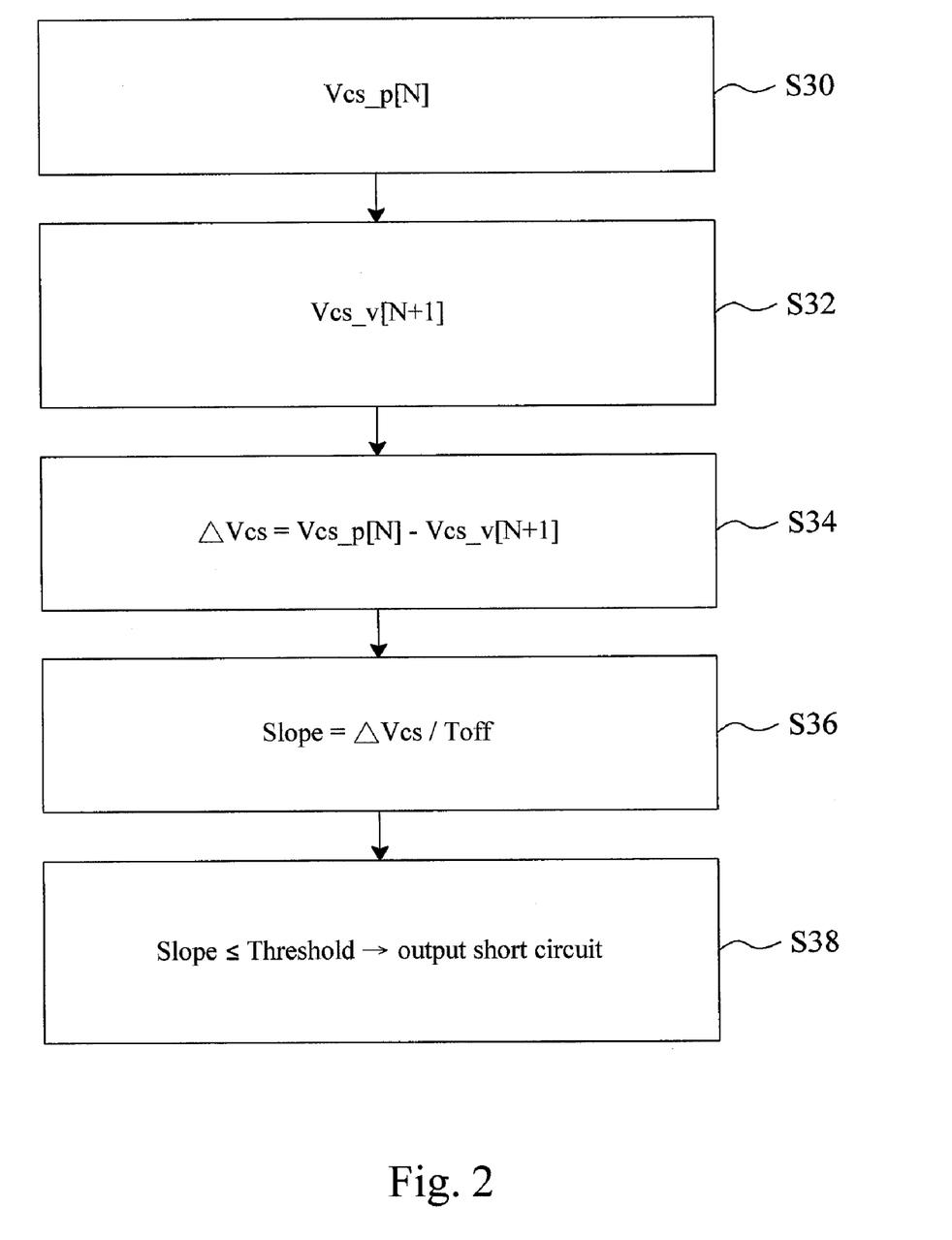
FIG. 2 is a flowchart of a first embodiment according to the present invention.
Figure 3:
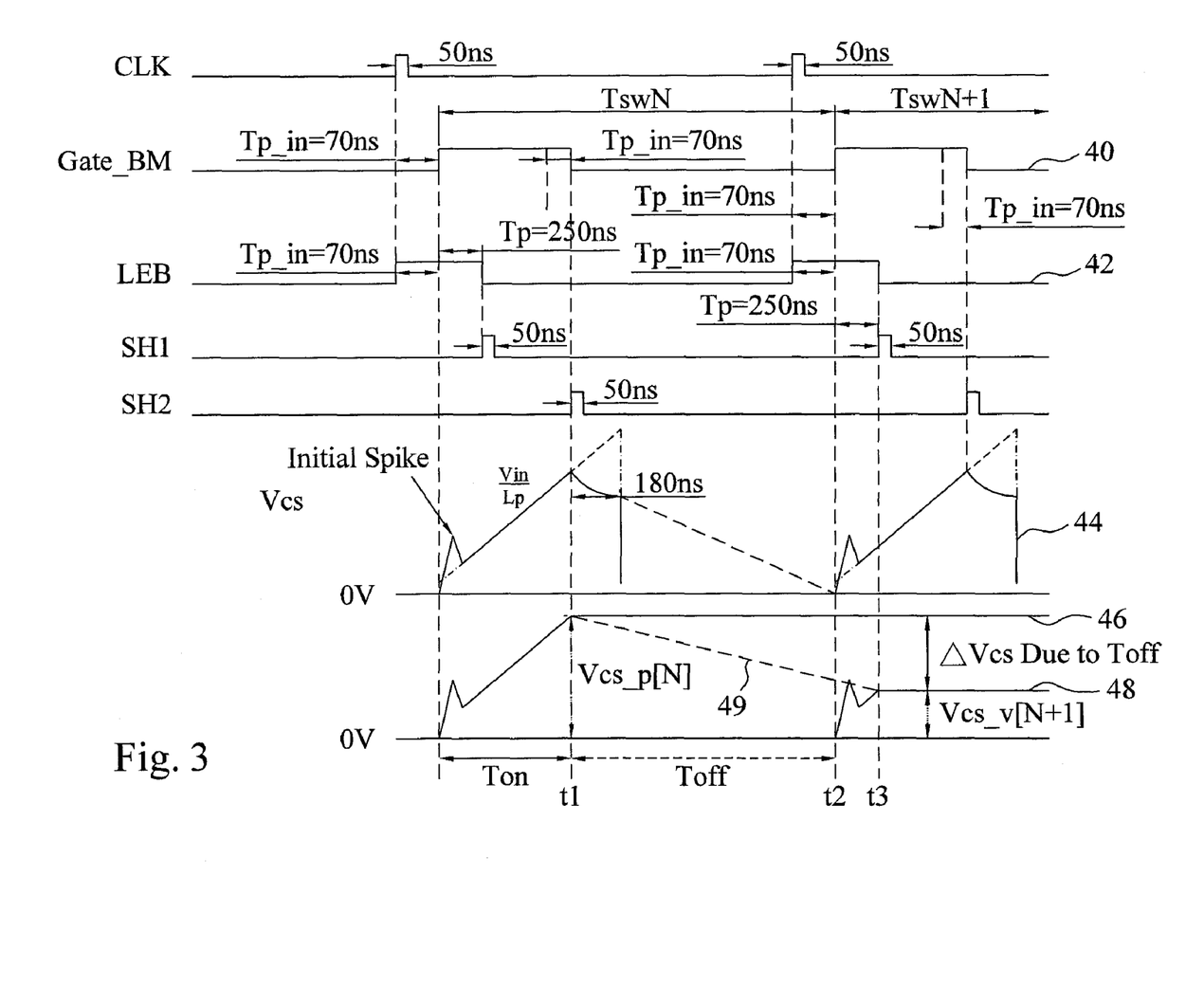
FIG. 3 is a waveform diagram of the circuit shown in FIG. 1 when using the method of FIG. 2.

FIG. 2 shows a first embodiment of detection for output short circuit of the flyback power supply 10 according to the present invention, and FIG. 3 is a waveform diagram of the flyback power supply 10 when using this method. Referring to FIGS. 1-3, the control signal Gate_BM switches the power switch 20 such that the power switch 20 is on when the control signal Gate_BM is high, and is off when the control signal Gate_BM is low. As shown by waveform 44, when the power switch 20 is turned on, the current sense signal Vcs has an initial spike. To prevent the initial spike from causing an error operation, it is well known for the power management IC 16 provided with a leading-edge blanking signal LEB to blank the initial spike, as shown by waveform 42. In this embodiment, step S30 detects the peak value Vcs_p[N] of the current sense signal Vcs during a switching cycle TswN, for example, by sampling the current sense signal Vcs when the power switch 20 is turned off, as shown at time t1, and step S32 detects the initial value Vcs_v[N+1] of the current sense signal Vcs during the next switching cycle TswN+1, for example, by sampling the current sense signal Vcs when the leading-edge blanking signal LEB is turned off. The period from the moment when the power switch 20 is turned on to the moment when the leading-edge blanking signal LEB is turned off, i.e., from time t2 to time t3, is very short, about 250 ns. Therefore, the sample of the current sense signal Vcs when the leading-edge blanking signal LEB is turned off can be viewed as equivalent to the sample of the current sense signal Vcs when the power switch 20 is turned on. In other words, the value Vcs_v[N+1] obtained by sampling the current sense signal Vcs when the leading-edge blanking signal LEB is turned off can be viewed as the initial value of the current sense signal Vcs, as shown by waveform 48.

Then, step S34 extracts the difference ΔVcs between the peak value Vcs_p[N] and the initial value Vcs_v[N+1], for example, by subtraction operation. The difference ΔVcs is related to the variation ΔVout of the output voltage Vout during the OFF-time Toff of the power switch 20. To identify output short circuit of the flyback power supply 10, step S36 divides the difference ΔVcs by the OFF-time Toff of the power switch 20 to obtain the slope as shown by the dashed line 49 of FIG. 3. The slope contains the output information, i.e., the variation ΔVout of the output voltage Vout. The dashed line 49 is the virtual waveform of the current sense signal Vcs during the OFF-time Toff. As shown in FIG. 3, the period from time t2 to time t3, about 250 ns, should be taken into account in calculation of the slope of the dashed line 49. However, since the OFF-time Toff of the power switch 20 often is as long as a few microseconds, the period from time t2 to time t3 is far shorter than the OFF-time Toff and is therefore negligible. Finally, step S38 compares the slope with a threshold. The variation ΔVout of the output voltage Vout approaches zero upon occurrence of output short circuit of the flyback power supply 10, so that the difference ΔVcs will be much reduced if the flyback power supply 10 suffers output short circuit and in consequence, the slope will decrease to the vicinity of zero. Hence, if the slope is detected smaller than the threshold, it may conclude that the flyback power supply 10 suffers output short circuit.

Figure 4:
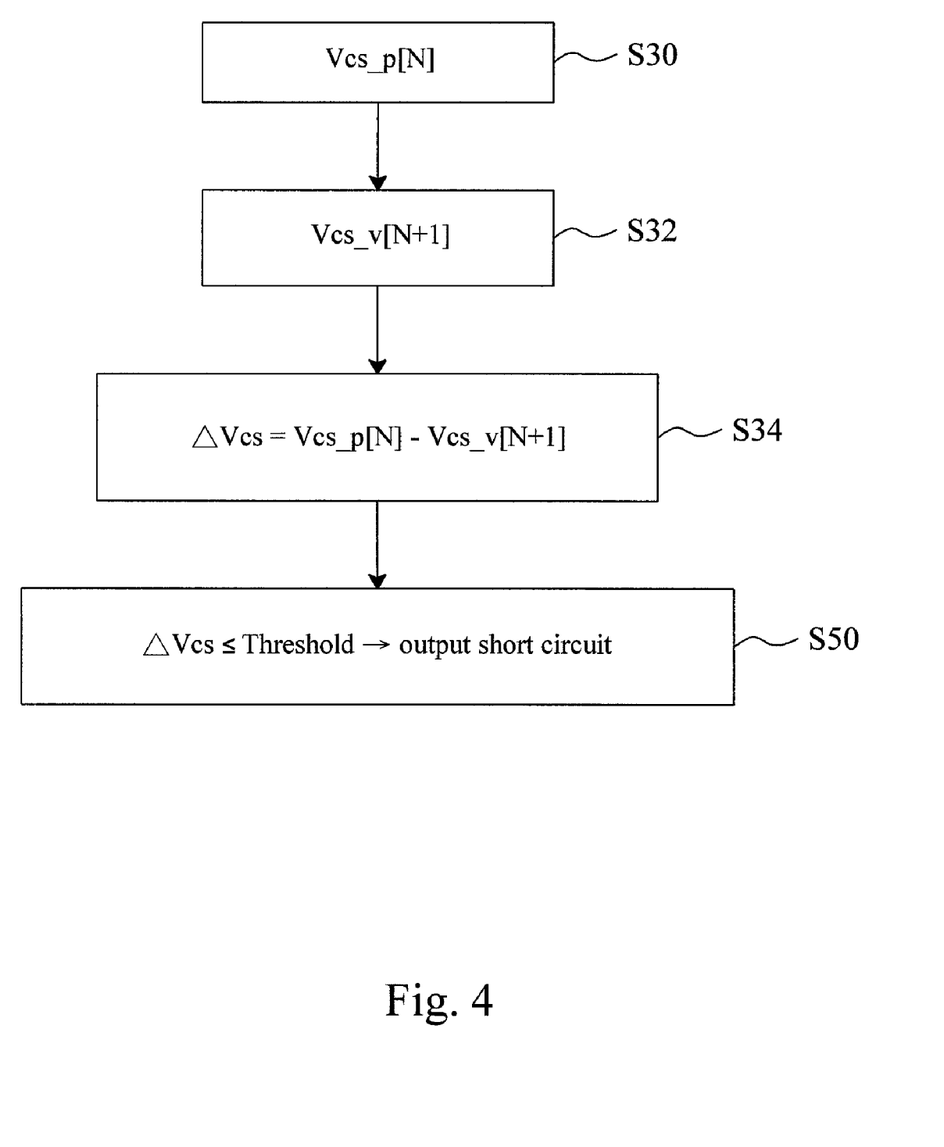
FIG. 4 is a flowchart of a second embodiment according to the present invention.

FIG. 4 shows a second embodiment of detection for output short circuit of the flyback power supply 10 according to the present invention, in which the first three steps S30, S32 and S34 are identical to those of the first embodiment shown in FIG. 2. In this embodiment, however, step S50 compares the difference ΔVcs with a threshold. As explained in the first embodiment, the difference ΔVcs will be much reduced upon occurrence of output short circuit of the flyback power supply 10, and therefore, if the difference ΔVcs is smaller than the threshold, it may conclude that the flyback power supply 10 suffers output short circuit.

Figure 5:
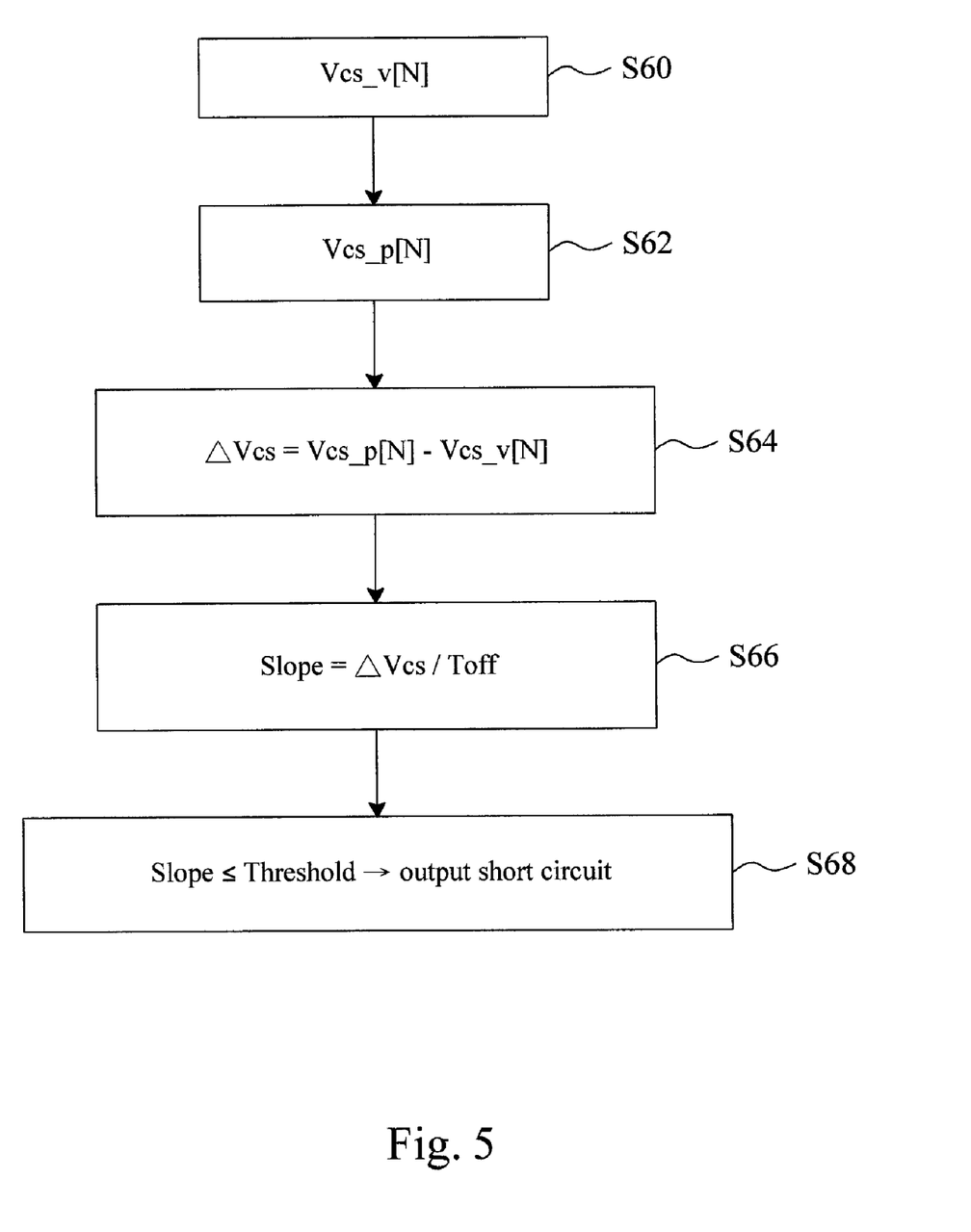
FIG. 5 is a flowchart of a third embodiment according to the present invention.
Figure 6:
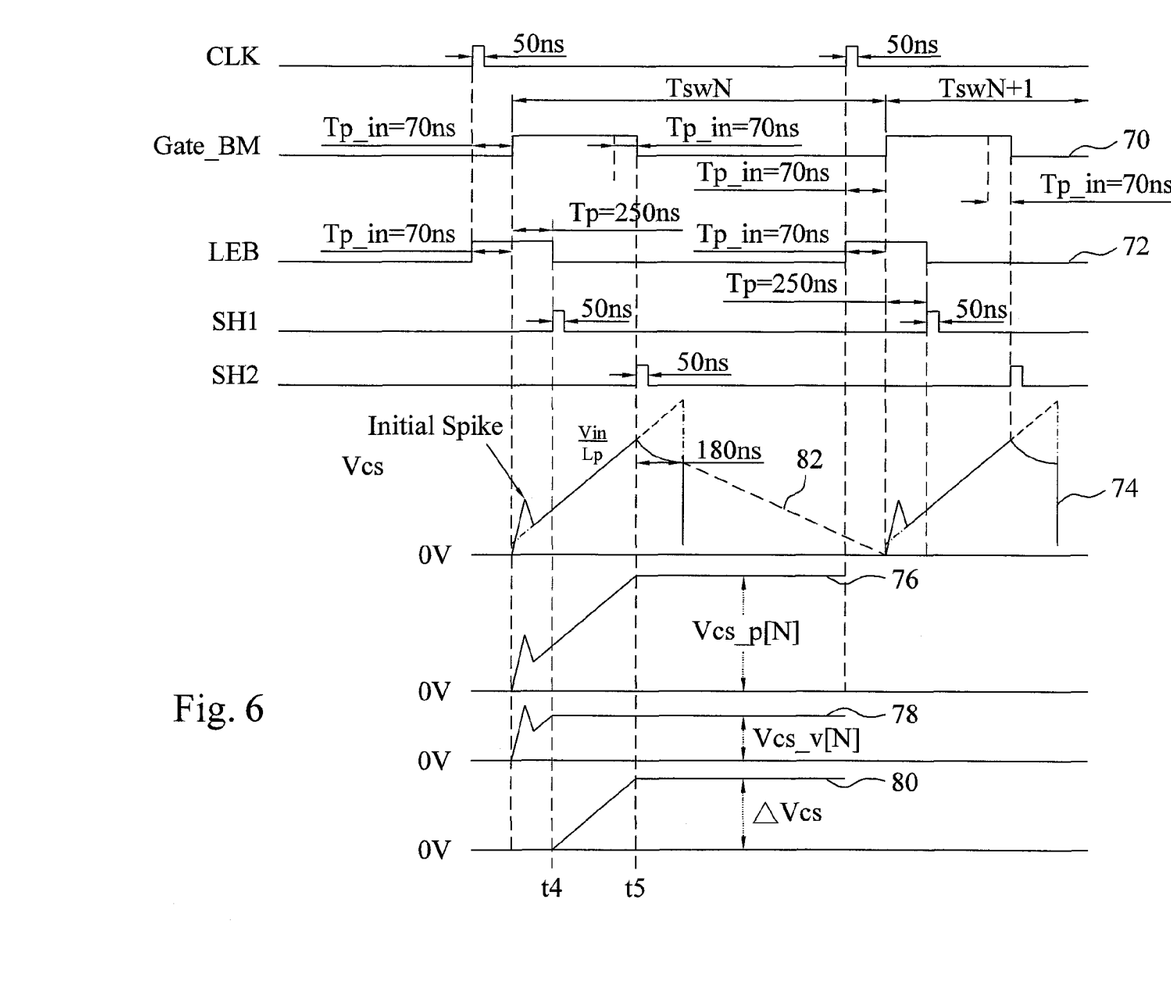
FIG. 6 is a waveform diagram of the circuit shown in FIG. 1 when using the method of FIG. 5.

If the flyback power supply 10 suffers output short circuit, the variation ΔVout of the output voltage Vout approaches zero, and after a few switching cycles, a steady state will be reached in which the initial value Vcs_v[N] of the current sense signal Vcs during a switching cycle TswN is substantially the same as the initial value Vcs_v[N+1] during the next switching cycle. Therefore, it is also feasible to identify output short circuit of the flyback power supply 10 by means of the peak value Vcs_p and the initial value Vcs_v of the current sense signal Vcs during a same switching cycle. Based on this, FIG. 5 shows a third embodiment of detection for output short circuit of the flyback power supply 10 according to the present invention, and FIG. 6 is a waveform diagram of the flyback power supply 10 when using this method. Referring to FIGS. 1, 5 and 6, step S60 detects the initial value Vcs_v[N] of the current sense signal Vcs during a switching cycle TswN, for example, by sampling the current sense signal Vcs when the leading-edge blanking signal LEB is turned off, as shown by waveforms 72 and 78 at time t4, and step S62 detects the peak value Vcs_p[N] of the current sense signal Vcs during the same switching cycle TswN, for example, by sampling the current sense signal Vcs when the control signal Gate_BM transits to low to turn off the power switch 20, as shown by waveforms 70 and 76 at time t5. Then, step S64 extracts the difference ΔVcs between the peak value Vcs_p[N] and the initial value Vcs_v[N], for example by subtraction operation, as shown by waveform 80. The difference ΔVcs is related to the variation ΔVout of the output voltage Vout during the OFF-time Toff of the power switch 20. To identify output short circuit of the flyback power supply 10, step S66 divides the difference ΔVcs by the OFF-time Toff of the power switch 20 to obtain the slope as shown by the dashed line 82 of FIG. 6. The slope contains the output information, i.e., the variation ΔVout of the output voltage Vout. The dashed line 82 is the virtual waveform of the current sense signal Vcs during the OFF-time Toff. Finally, step S68 compares the slope with a threshold. If the slope is detected smaller than the threshold, it concludes that the flyback power supply 10 suffers output short circuit.

Figure 7:
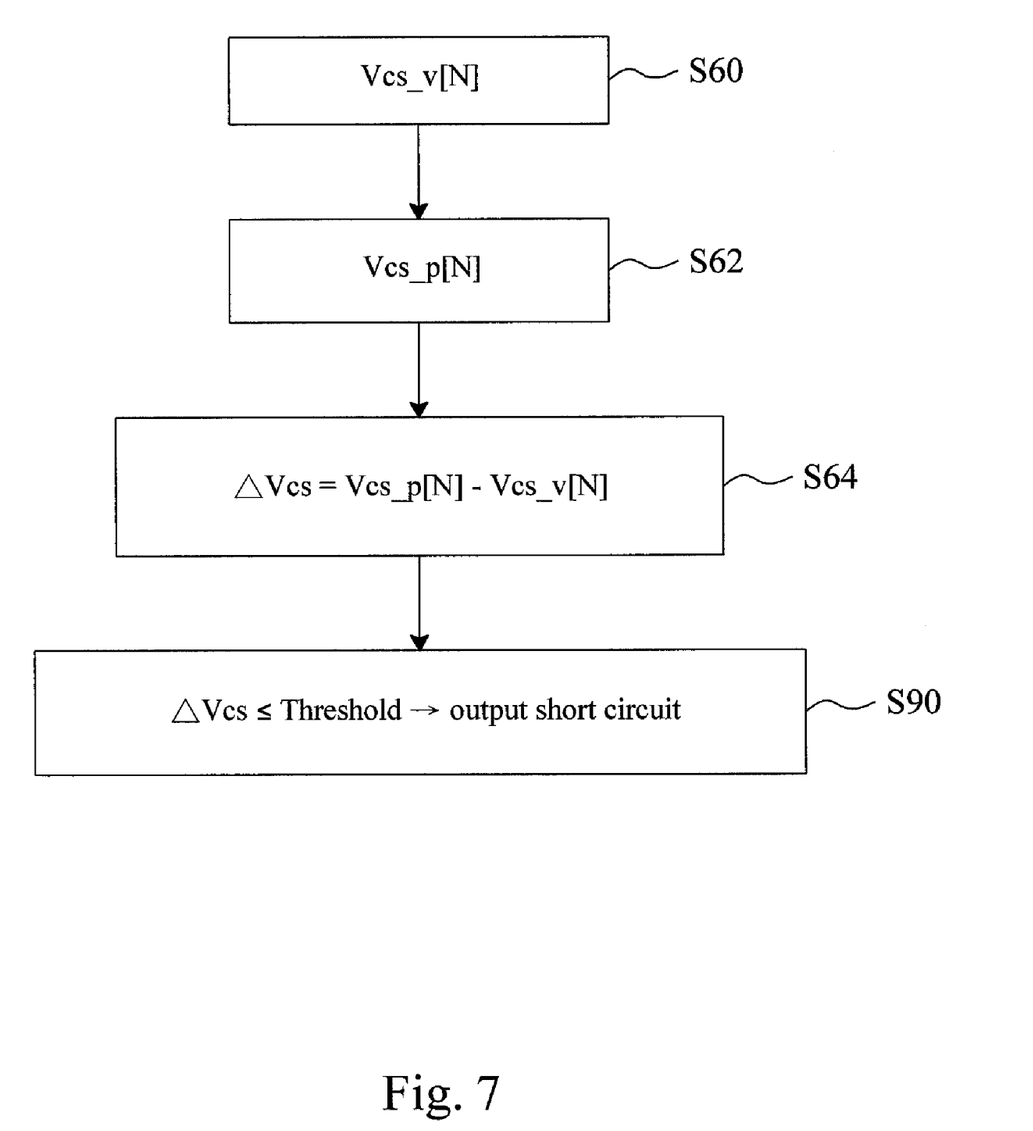
FIG. 7 is a flowchart of a fourth embodiment according to the present invention.

FIG. 7 shows a fourth embodiment of detection for output short circuit of the flyback power supply 10 according to the present invention, in which the first three steps S60, S62 and S64 are identical to those of the third embodiment shown in FIG. 5. In this embodiment, however, step S90 compares the difference ΔVcs with a threshold. If the difference ΔVcs is smaller than the threshold, it concludes that the flyback power supply 10 suffers output short circuit.

Figure 8:
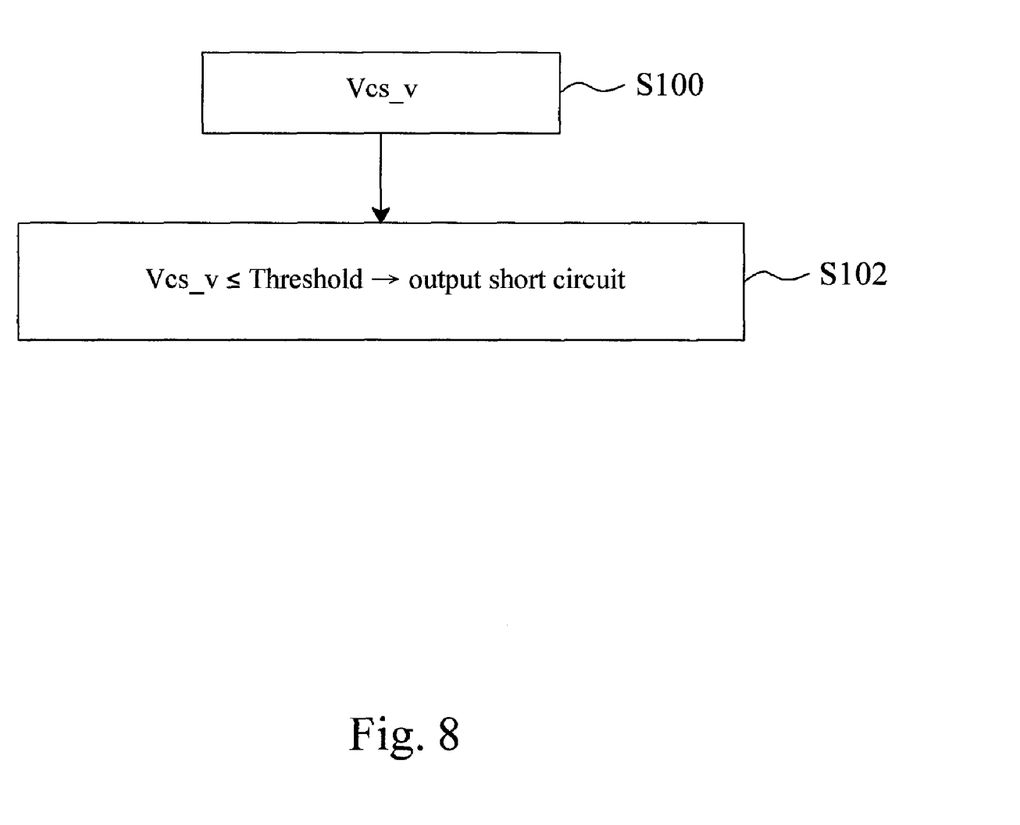
FIG. 8 is a flowchart of a fifth embodiment according to the present invention.
Figure 9:
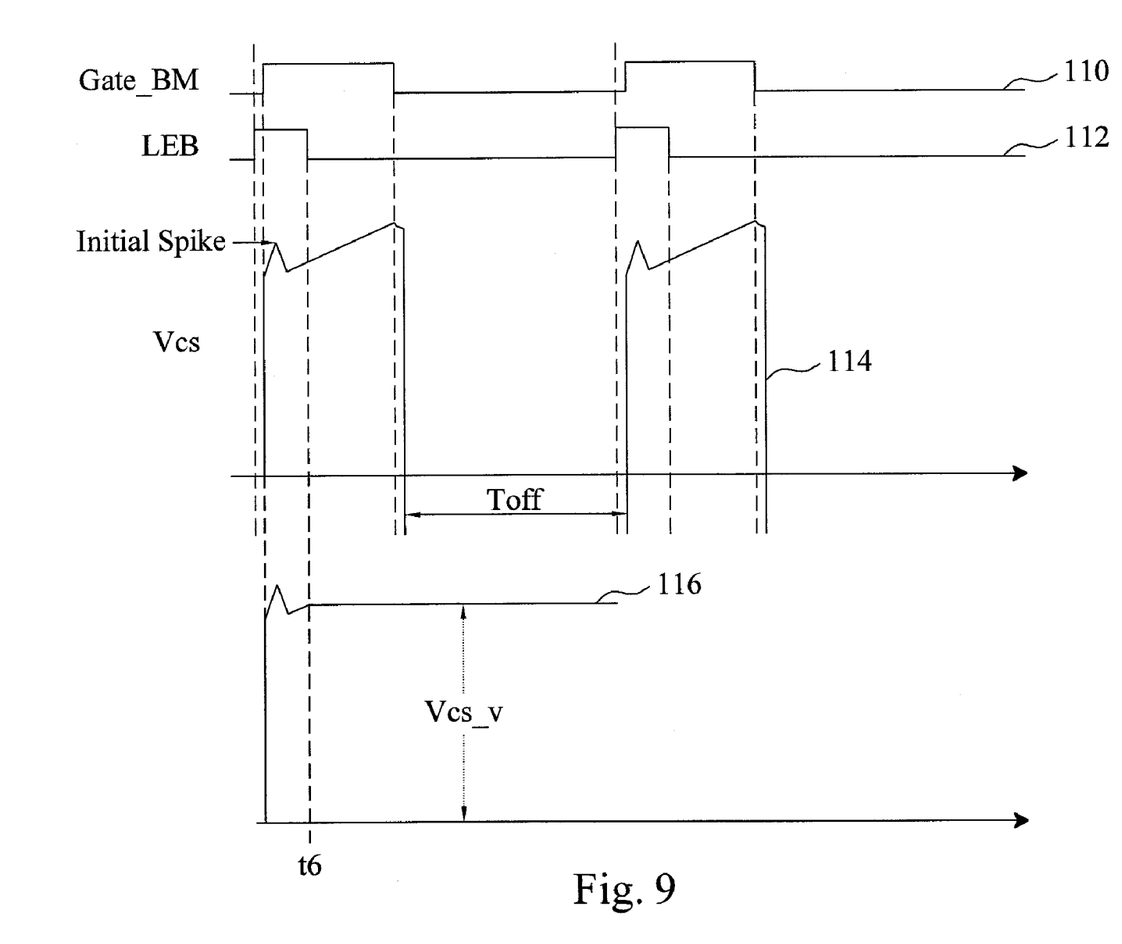
FIG. 9 is a waveform diagram of the circuit shown in FIG. 1 when using the method of FIG. 8.

FIG. 8 shows a fifth embodiment of detection for output short circuit of the flyback power supply 10 according to the present invention, and FIG. 9 is a waveform diagram of the flyback power supply 10 when using this method. As shown by waveforms 110 and 114, during the period that the control signal Gate_BM is high, the power switch 20 is on and thus the current sense signal Vcs increases continuously; once the control signal Gate_BM transits to low, the power switch 20 is turned off and thus the current sense signal Vcs jumps to zero. Referring to FIGS. 1, 8 and 9, step S100 detects the initial value Vcs_v of the current sense signal Vcs during a switching cycle, for example, by sampling the current sense signal Vcs when the leading-edge blanking signal LEB is turned off, as shown by waveform 112 at time t6. Since the period from the moment when the power switch 20 is turned on to the moment when the leading-edge blanking signal LEB is turned off is very short, the sample of the current sense signal Vcs when the leading-edge blanking signal LEB is turned off can be regarded as equivalent to the sample of the current sense signal Vcs when the power switch 20 is turned on. If the flyback power supply 10 suffers output short circuit, the variation ΔVout of the output voltage Vout will be close to zero, and after a few switching cycles, a steady state will be reached in which, due to the fact that the variation ΔVout approaches zero, the initial value Vcs_v of the current sense signal Vcs will not be reset. In other words, if output short circuit occurs, the initial value Vcs_v of the current sense signal Vcs will rise up. Therefore, after the step S100, step S102 compares the initial value Vcs_v with a threshold to identify output short circuit. If the initial value Vcs_v is greater than the threshold, it will conclude that the flyback power supply 10 suffers output short circuit.

When the flyback power supply 10 suffers output short circuit, methods according to the present invention, which monitors the current sense signal Vcs from the current sense pin CS, may quickly identify the output short circuit within only a few switching cycles, approximately a dozen to tens of microseconds (μs). Compared with the conventional methods which monitor either the feedback pin COMP or the power pin VDD in detection for output short circuit, detection by methods according to the present invention is carried out faster and immediately.

While the present invention has been described in conjunction with preferred embodiments thereof, it is evident that many alternatives, modifications and variations will be apparent to those skilled in the art. Accordingly, it is intended to embrace all such alternatives, modifications and variations that fall within the spirit and scope thereof as set forth in the appended claims.

What is claimed is:

1. A method of detection for output short circuit of a flyback power supply including a power switch and a current sense resistor serially connected to the power switch to provide a current sense signal, the method comprising the steps of:
   (A) detecting a peak value of the current sense signal during a first cycle;
   (B) detecting an initial value of the current sense signal during a second cycle next to the first cycle; and
   (C) identifying output short circuit by monitor a difference between the peak value and the initial value.

2. The method of claim 1, wherein the step (A) comprises the step of sampling the current sense signal when the power switch is turned off during the first cycle.

3. The method of claim 1, wherein the step (B) comprises the step of sampling the current sense signal when the power switch is turned on during the second cycle.

4. The method of claim 1, wherein the step (C) comprises the steps of:
   dividing the difference by an OFF-time of the power switch for recognizing a slope; and
   if the slope is smaller than a threshold, concluding that the flyback power supply suffers output short circuit.

5. The method of claim 1, wherein the step (C) comprises the step of concluding that the flyback power supply suffers output short circuit if the difference is smaller than a threshold.

6. A method of detection for output short circuit of a flyback power supply including a power switch and a current sense resistor serially connected to the power switch to provide a current sense signal, the method comprising the steps of
   (A) detecting an initial value of the current sense signal during a cycle;
   (B) detecting a peak value of the current sense signal during the cycle; and
   (C) identifying output short circuit by monitor a difference between the peak value and the initial value.

7. The method of claim 6, wherein the step (B) comprises the step of sampling the current sense signal when the power switch is turned off during the cycle.

8. The method of claim 6, wherein the step (A) comprises the step of sampling the current sense signal when the power switch is turned on during the cycle.

9. The method of claim 6, wherein the step (C) comprises the steps of:
   dividing the difference by an OFF-time of the power switch for recognizing a slope; and
   if the slope is smaller than a threshold, concluding that the flyback power supply suffers output short circuit.

10. The method of claim 6, wherein the step (C) comprises the step of concluding that the flyback power supply suffers output short circuit if the difference is smaller than a threshold.

11. A method of detection for output short circuit of a flyback power supply including a power switch and a current sense resistor serially connected to the power switch to provide a current sense signal, the method comprising the steps of:
   (A) detecting an initial value of the current sense signal during a cycle; and
   (B) if the initial value is greater than a threshold, concluding that the flyback power supply suffers output short circuit.

12. The method of claim 11, wherein the step (A) comprises the step of sampling the current sense signal when the power switch is turned on during the cycle.

* * * * *